Patented Feb. 13, 1951

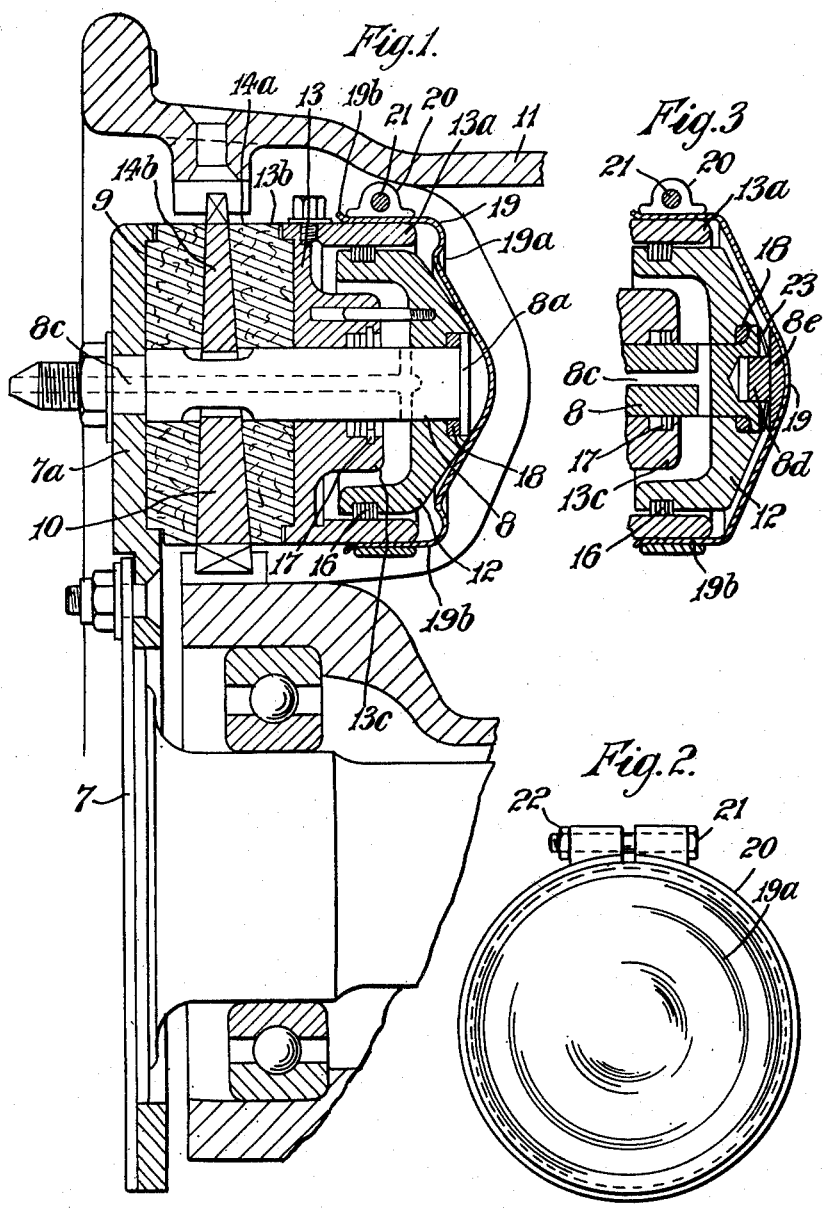

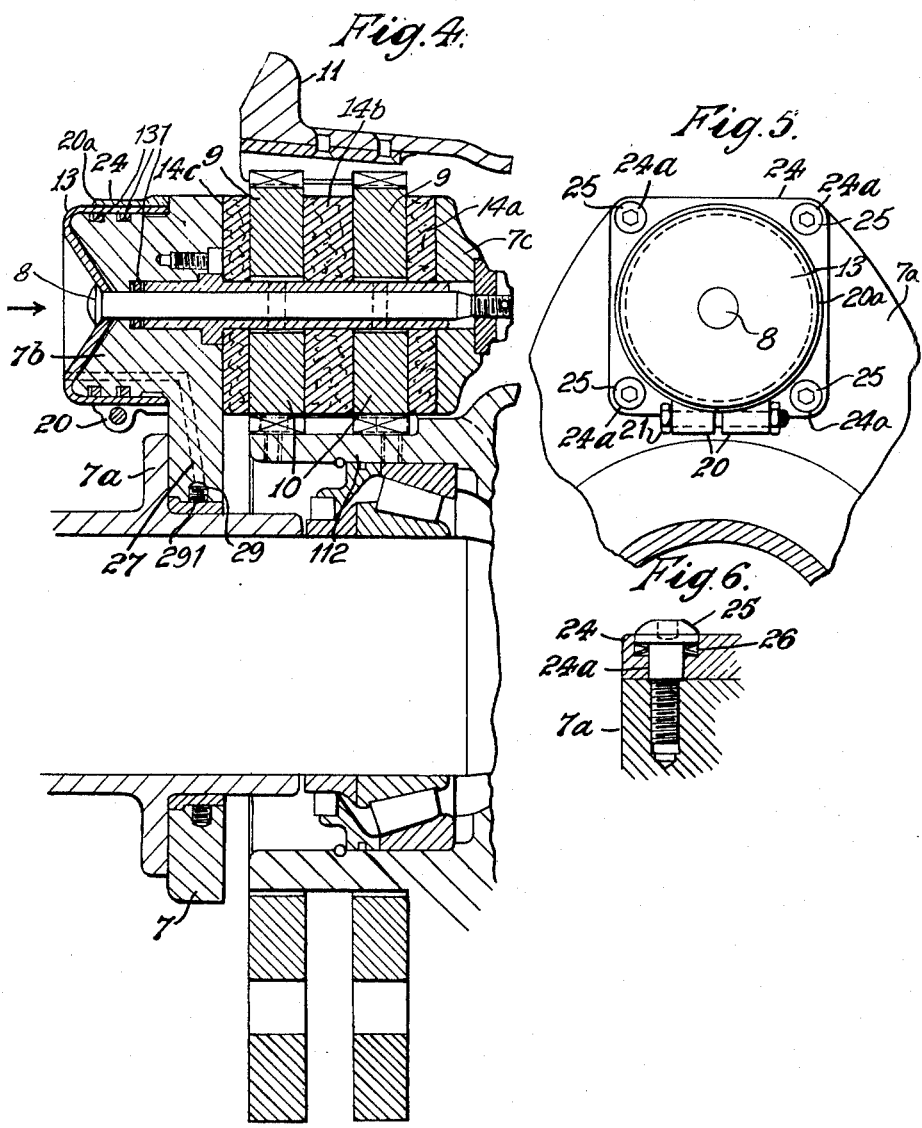

2,541,032

UNITED STATES PATENT OFFICE 2,541,032

FLUID PRESSURE OPERATED DISK BRAKE WITH AUTOMATIC WEAR COMPENSATION

Henry James Butler, Sutton Coldfield, England, assignor to Dunlop Rubber Company Limited, county of London, England, a British company Application September 14, 1946, Serial No. 697,015
In Great Britain July 25, 1946

7 Claims. (Cl. 188—152)

My invention has reference to improvements relating to fluid operated disc brakes which comprise rotatable and non-rotatable braking elements with especial reference to fluid operated disc brakes for the landing wheels of aircraft.

With such brakes it is desirable that there should be just a bare clearance between the complementary rotating and non-rotating braking surfaces when the brake is out of action and that as a consequence provision should be made for compensating for such wear of the friction surfaces as may take place in order that a minimum clearance as aforesaid may be retained.

The present invention has for its object to provide an improved means for compensating automatically for wear of the friction surfaces in brakes as aforesaid.

According to the invention fluid-operated disc brakes of the type having rotatable and non-rotatable braking elements are provided which comprise a brake-applying member in frictional engagement with spring-operated retraction means which is deformed or displaced by movement of said member to apply braking pressure and which slips on said member on movement of said member in excess of a predetermined amount, thereby compensating for wear of the braking elements.

The invention will now be described with particular reference to the accompanying drawings which illustrate the invention as applied to an aircraft braking system.

Figure 1 is a part sectional side elevation of a brake operating means embodying a preferred form of my invention.

Figure 2 is an end view of part of Figure 1 looking from the right of said figure.

Figure 3 is a fragmentary view illustrating a modification of the arrangement illustrated in Figure 1.

Figure 4 is a sectional view of another brake operating means embodying the invention.

Figure 5 is an end elevation of part of Figure 4 looking in the direction of the arrow in the said figure and Figure 6 is a fragmentary view on an enlarged scale showing the means of securing the clamping plate to the associated part of the apparatus in the arrangement illustrated in Figures 4 and 5.

In the drawings, like numerals of reference indicate similar or analogous parts in the several views.

In the form illustrated in Figures 1 and 2 of the drawings, each of the hydraulically operated brake actuating means is mounted on an arm 7a of a spider 7, and associated with this arm 7a is a pin 8 which passes through a space between two annuli 9 and 10 which are non-rotatable but axially displaceable relatively to an aircraft wheel 11 in the manner disclosed in U. S. application Ser. No. 697,014, filed September 14, 1946.

The pin 8 is provided with a head 8a and mounted on the pin 8 adjacent to the head 8a is a cup shaped member 12, which is embraced by the circumferential wall 13a of a sleeve 13 the pressure exerting face 13b of which is in abutment with the presented faces of a brake pad 14a, adapted to exert a braking effort on the adjacent faces of the annuli 9 and 10. A similar brake pad 14b is located on the opposite side of the annuli 9 and 10.

Sealing rings 16 are inserted in grooves in the member 12 so as to ensure a fluid tight sealing between the circumferential wall 13a of the sleeve 13 and the adjacent surface of the member 12. A sealing ring 172 is located within an inwardly directed centrally disposed portion 13c of the sleeve 13 by means of a cover plate 171 and a split ring 17. A sealing ring 18 is interposed between the head 8a and the bottom of the recess in the member 12 within which it is disposed in order to effect a fluid tight seal between the relevant parts.

The circumferential wall 13a of the sleeve 13 is enclosed within an envelope 19 having a corrugated bottom 19a and a circumferential wall 19b which is clamped in frictional engagement with the wall 13a of the sleeve 13 by means of a split clamp 20 which may be tightened up by a bolt 21 and a nut 22, said envelope 19 being made of a relatively resilient material and being capable of being flexed.

Fluid is introduced into the space between the presented surfaces of the sleeve 13 and of the member 12 by way of an axial bore 8c formed in the pin 8.

In operation when fluid pressure is introduced into the space aforesaid the sleeve 13 is displaced relatively to the member 12 and caused to apply braking pressure to the brake pads 14a, 14b. This displacement of the sleeve 13 relatively to the member 12 occasions a slight flexing of the bottom 19a of the envelope 19 which flexing is facilitated by the corrugations of the said bottom 19a. Thus on the release of pressure the inherent resiliency in the envelope 19 acts as a return spring and restores the sleeve 13 to the initial position.

It should be understood however that the degree of flexing of the bottom 19a of the envelope 19 is very small as only sufficient return movement of the sleeve 13 is required as is necessary to permit of the free running of the annuli 9 and 10 between the blocks 14a, 14b when the fluid pressure is relieved.

In the event of the wear of the brake pads 14a, 14b, the sleeve 13 must normally be further displaced by an amount equal to that wear. The degree of flexing of the envelope 19 is however insufficient to allow for any additional movement of the sleeve 13 but alternatively the sleeve is free to slip in the envelope 19 by an amount sufficient to compensate for the wear. The amount of movement of the sleeve 13 on the application of the fluid pressure is therefore substantially constant no matter how the brake pads 14a, 14b wear in service.

In the arrangement illustrated in Figure 3 which is a modification of the construction shown in Figures 1 and 2 an envelope 19 again is clamped into frictional contact with the wall of the sleeve 13 by a split clamp 20 but in this construction the envelope 19 is nonyielding and slidably mounted within the end of the pin 8 is a plunger 8d having a domed head 8e adapted to abut a complementary shaped portion of the envelope 19. Interposed between the domed head 8e and the adjacent end of the pin 8 is a spring washer 23. A sealing ring 172 is located by a split ring 171 lying within the lip 173 of the portion 13c.

In operation when braking pressure is applied the spring washer 23 is compressed so that upon the release of pressure the stored energy comes into operation to restore the parts to their initial position.

In the event again of wear of the frictional surfaces slip takes place between the sleeve 13 and the envelope 19 so as to compenate automatically for such wear.

In the arrangement illustrated in Figures 4-6 the sleeve 13 is externally disposed and is frictionally engaged by a split clamp 20 associated with a plate 24. Seals 131 and 131a are provided between the portion 7b and the sleeve 13 and pin 8. The plate 24 is secured to the arm 7a of the spider by means of bolts 25 the shanks of which pass through and are slidable within holes 24a adjacent to the corners of the said plate 24 and interposed between the heads of the bolts 25 and the bottoms of the recesses bounding the holes in the plate 24 through which the bolts 25 pass are spring washers 26 conveniently of the Belleville type.

Fluid pressure is introduced into the space between the inner surface of the head of the sleeve 13 and the complementary block 7b by way of a passage 27 which communicates with a source of pressure fluid through an annular passage 29 having a sealing ring 291.

In this construction two sets of annuli 9 and 10 are employed and on the application of fluid pressure the sleeve 13 is displaced relatively to the block 7b thereby applying braking pressure to brake pads 14a, 14b and 14c. At the same time the displacement of the sleeve 13 occasions a compression of the spring washers 26 so that upon the release of pressure the energy stored in the said spring 26 comes into operation to restore the sleeve 13 to its initial position.

In the event of wear of the frictional surfaces slip again can take place between the sleeve 13 and the clamp 20 in order to permit of an automatic increase of the volume of the liquid filled space to compensate for the wear of the frictional surfaces and thus maintain substantially constant the degree of displacement permitted between the sleeve and the block 7b.

Having described my invention, what I claim is:

1. Fluid pressure operated disc brakes which comprise inner and outer annular brake discs, said discs being spaced radially apart and capable of limited axial displacement, a fixed annular braking element disposed on one side of said discs, an axially displaceable annular braking element disposed on the opposite side of said discs to contact at any instant with only a portion of the braking area of said discs, and fluid-pressure operated piston and cylinder mechanism mounted to effect frictional contact between said discs and said elements, said mechanism comprising a brake-applying member engaging one face of said displaceable braking element and having an axially extending skirt, a cup-shaped member in fluid-tight engagement with the inner wall of said skirt and defining with said brake-applying member a chamber for pressure fluid, an axially extending pin passing through the centers of said members and elements and between said discs and engaging with the outer face of said cup-shaped member to restrain it from outward movement, and retraction means comprising an envelope in frictional engagement with the outer wall of said skirt to slip on said brake applying member when brake-applying movement of said member exceeds a predetermined amount.

2. Fuild-operated disc brakes according to claim 1 wherein a plurality of sets of fixed and axially displaceable braking elements are symmetrically disposed around the braking surfaces of the brake discs.

3. Fluid pressure operated disc brakes which comprise a plurality of inner and outer annular brake discs, said inner and outer discs being spaced radially apart and capable of limited axial displacement, a fixed annular braking element and an outer axially displaceable braking element disposed adjacent the external surfaces of said plurality of discs and an inner axially displaceable braking element disposed between each pair of discs, said elements being relatively movable to contact at any instant with only a portion of the braking area of said discs, and fluid-pressure operated piston and cylinder mechanism to effect frictional contact between said discs and said elements, said mechanism comprising a brake-applying member engaging one face of said outer displaceable braking element and having an axially extending skirt, a cup-shaped member in fluid-tight engagement with the inner wall of said skirt and defining with said brake-applying member a chamber for pressure fluid, an axially extending pin passing through the centers of said members and elements and between said discs and engaging with the outer face of said cup-shaped member to restrain it from outward movement, and retraction means comprising an envelope in frictional engagement with the outer wall of said skirt to slip on said brake-applying member when brake-applying movement of said member exceeds a predetermined amount.

4. Fluid pressure operated disc brakes which comprise inner and outer, axially displaceable, annular brake discs, a pair of non-rotatable braking elements disposed on opposite sides of said discs and extending less than the circumference of said discs, one of said elements being displaceable axially toward the other and fluid pressure operated piston and cylinder mechanism to move said displaceable element toward the other element to effect frictional contact between said discs and said elements, said mechanism comprising a brake applying member engaging one face of the displaceable braking element and retraction means including a spring loaded cover having a slidable frictional engagement with said displaceable braking element to slip thereon when said brake applying member moves beyond a predetermined distance.

5. Fluid pressure operated disc brakes which comprise inner and outer rotatable axially displaceable annular brake discs, a fixed braking element on one side of said discs and an axially displaceable braking element on the opposite side of said discs, said elements extending over only a part of the circumference of said discs, a fluid pressure operated mechanism to move said displaceable braking element toward said fixed elements to effect frictional contact between said discs and said elements, said fluid pressure operated mechanism comprising a fixed piston member, a cover slidably fitted over said piston, a pin connected to said cover and passing through said piston and connected to said axially movable braking element, and a flanged sleeve member frictionally gripping the outer wall of said cover and adapted to permit said cover to slip when movement of said braking member exceeds a predetermined amount, said flanged sleeve member being secured to the piston by spring loaded means to permit a limited axial movement.

6. The apparatus of claim 4 having a plurality of braking elements and fluid pressure operated mechanism arranged in circumference series, the total circumferential extent of said elements on said discs being less than the circumference of said discs.

7. A brake applying member which comprises an open ended cylinder, a piston in said cylinder having an extension through the open end of said cylinder, and a flexible envelope having a slidable frictional engagement with the periphery of said cylinder and extending over the end of said piston, said envelope engaging the center part of said piston and being slightly spaced from the outer parts to flex under a limited movement of said piston and then being engaged to slide on said cylinder upon further movement of said piston.

HENRY JAMES BUTLER.

REFERENCES CITED

The following references are of record in the file of this patent:

UNITED STATES PATENTS

| Number | Name | Date |
|---|---|---|
| 2,138,206 | Rasmussen et al. | Nov. 29, 1938 |
| 2,146,009 | Chase | Feb. 7, 1939 |
| 2,189,134 | Chard | Feb. 6, 1940 |
| 2,234,689 | Chard | Mar. 11, 1941 |
| 2,274,885 | Brown | Mar. 3, 1942 |
| 2,319,231 | Hawley | May 18, 1943 |
| 2,358,740 | Scott-Iversen | Sept. 19, 1944 |
| 2,366,093 | Forbes | Dec. 26, 1944 |
| 2,371,554 | Scott-Iversen | Mar. 13, 1945 |
| 2,392,970 | Bricker | Jan. 15, 1946 |
| 2,419,113 | Bricker | Apr. 15, 1947 |